Aug. 6, 1935.   L. F. NENNINGER ET AL   2,010,557
MACHINE TOOL STRUCTURE
Filed May 2, 1934   4 Sheets-Sheet 1
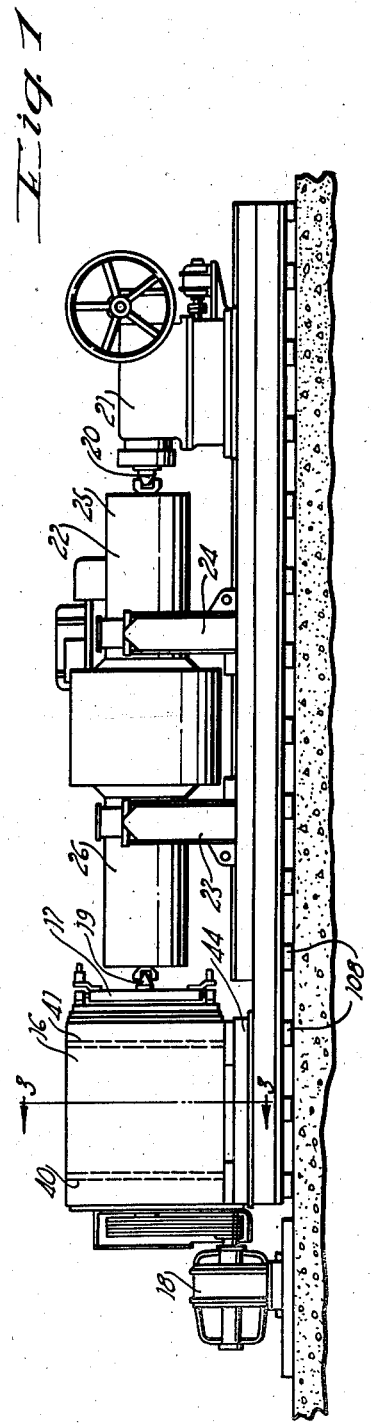
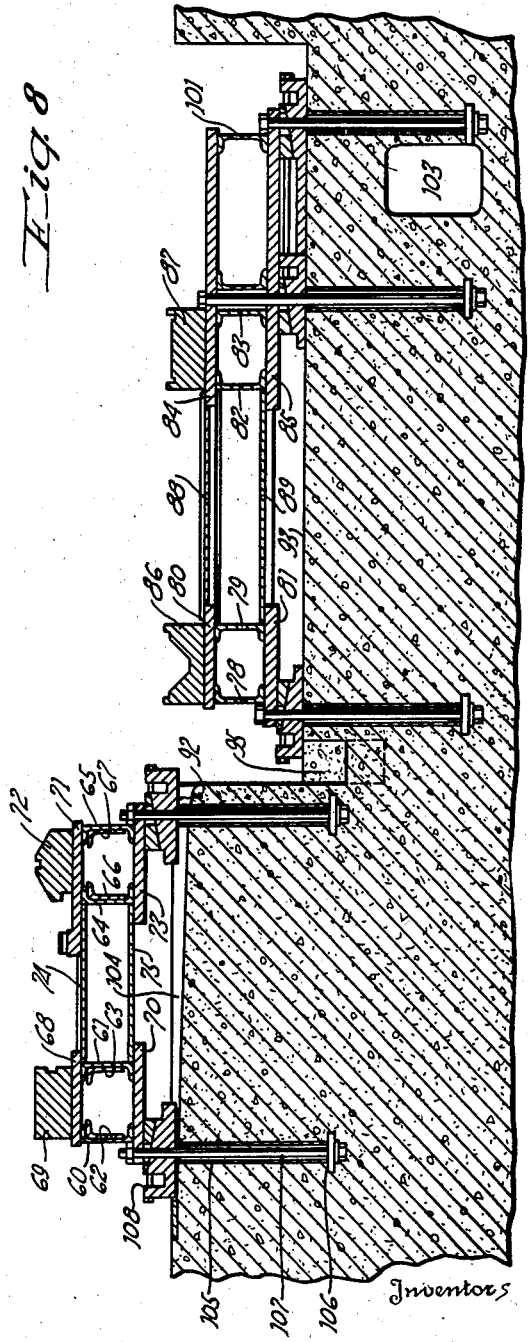
Inventors
LESTER F. NENNINGER
WILLETTS PEASLEE
By A. H. Parsons
Attorney

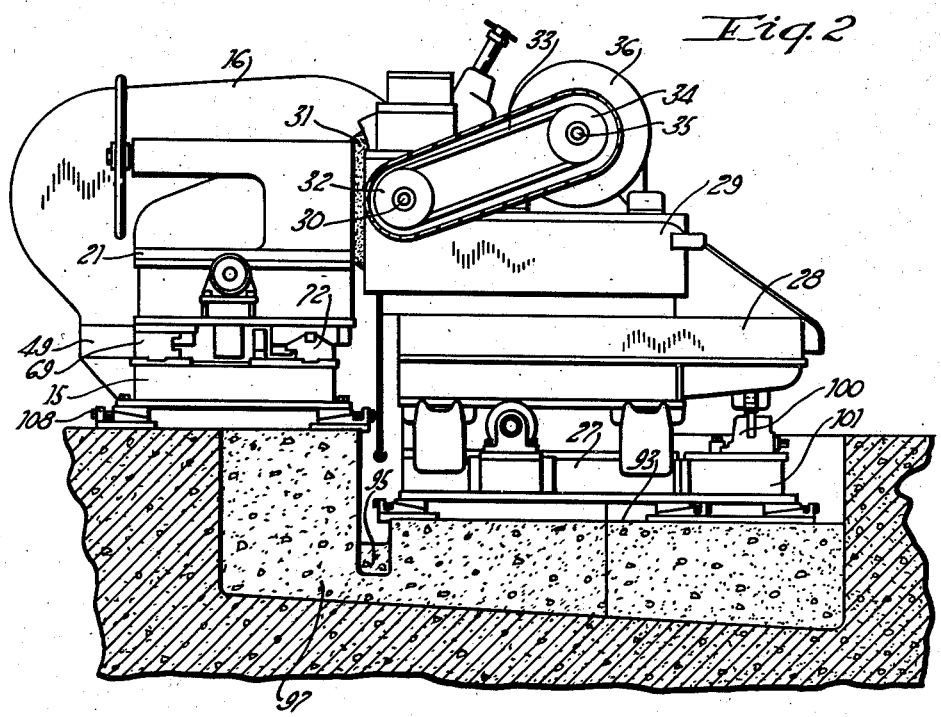
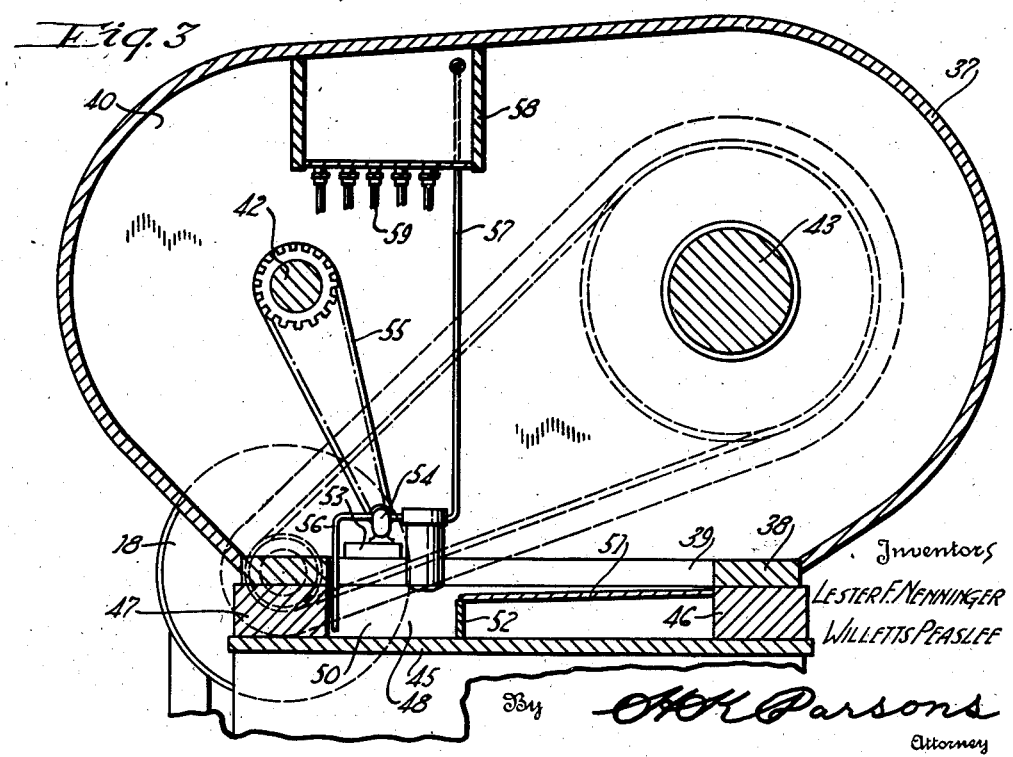

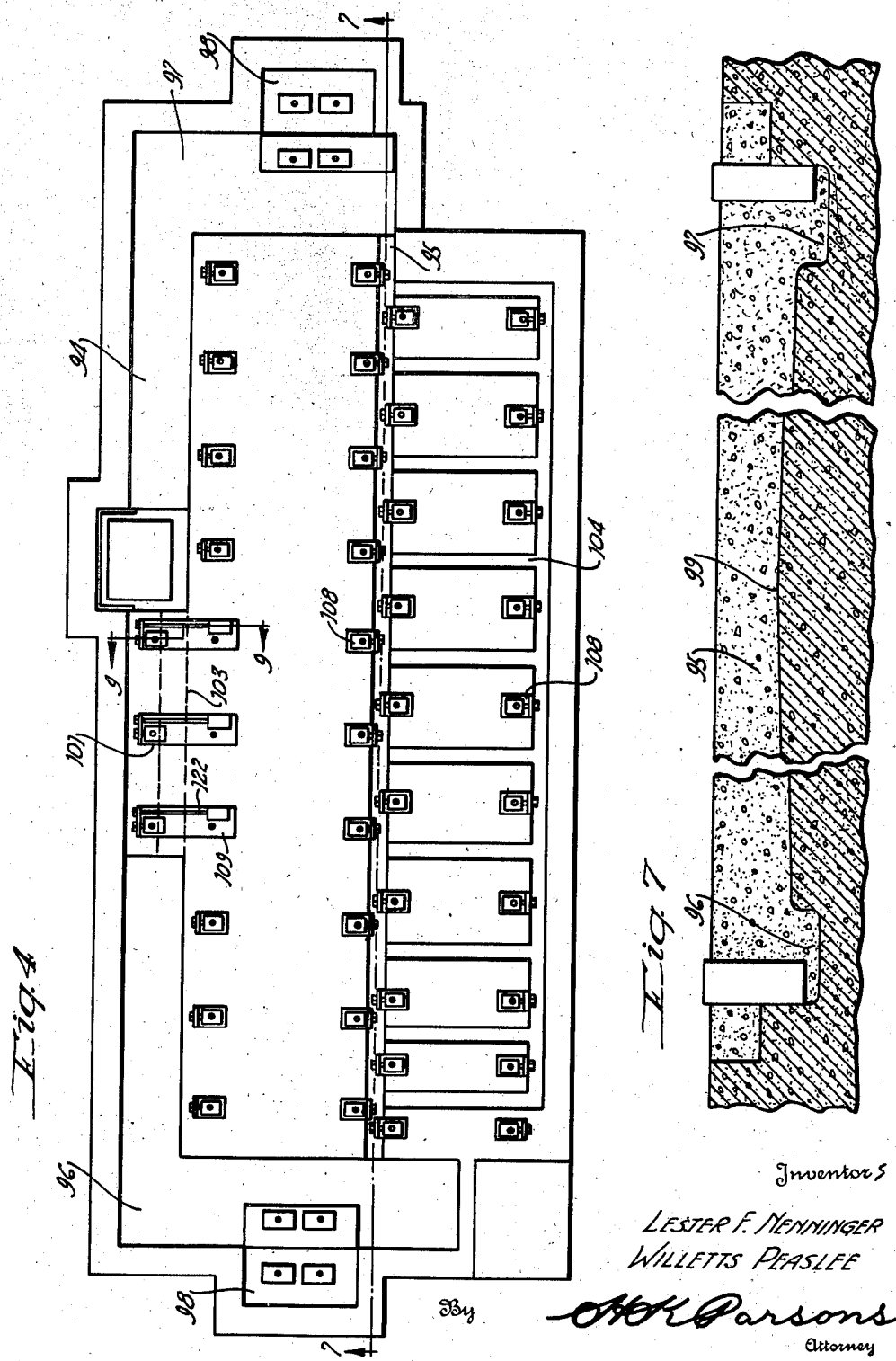

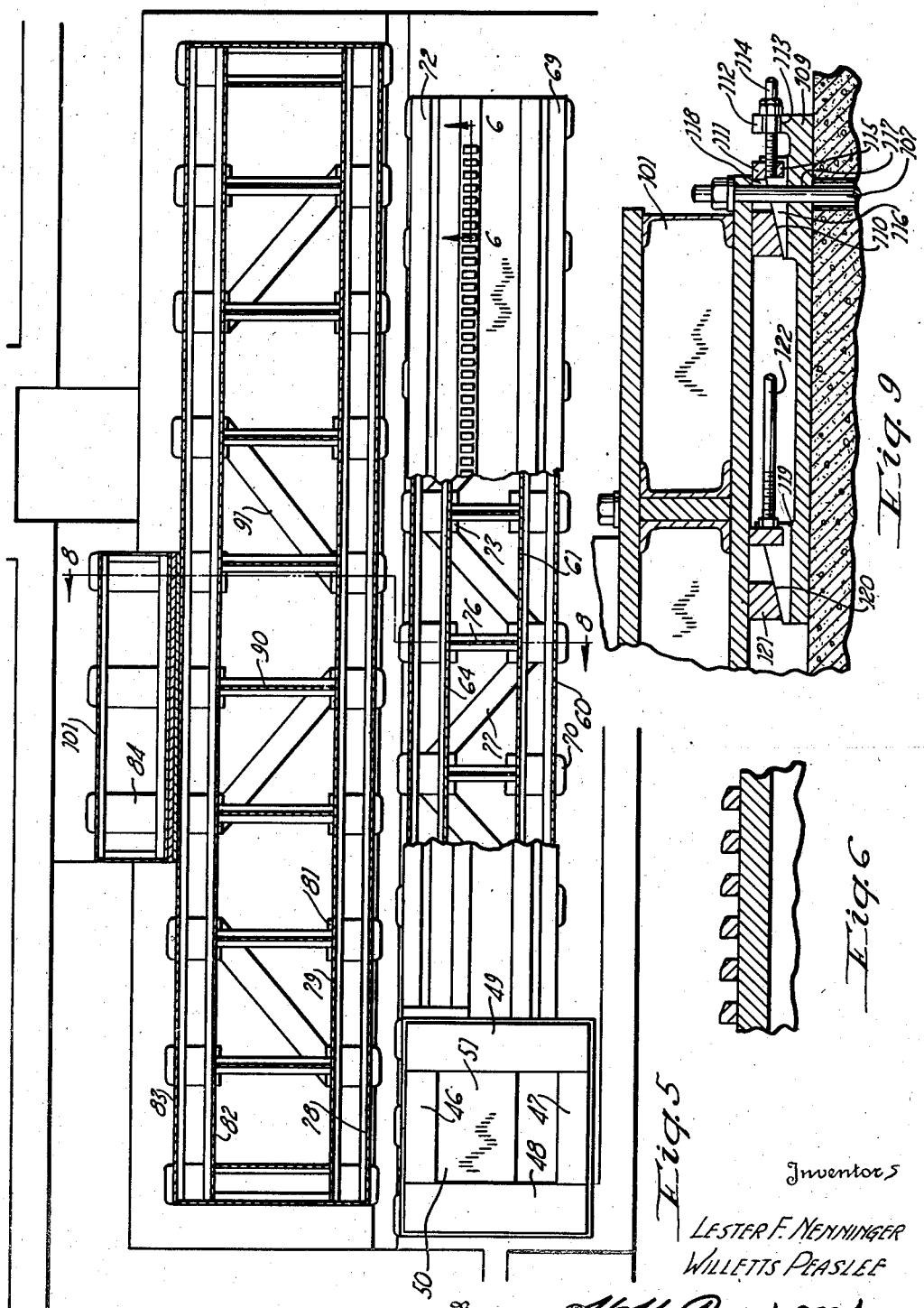

Patented Aug. 6, 1935

2,010,557

UNITED STATES PATENT OFFICE 2,010,557

MACHINE TOOL STRUCTURE

Lester F. Nenninger and Willetts Peaslee, Cincinnati, Ohio, assignors to Cincinnati Grinders Incorporated, Cincinnati, Ohio, a corporation of Ohio Application May 2, 1934, Serial No. 723,576

12 Claims. (Cl. 51—49)

This invention relates to machine tools and particularly to the supporting structures therefor.

An object of the invention is therefore the provision of an improved supporting structure for machine tools and particularly for very heavy ponderous types thereof.

Another object of the invention is the provision of an improved supporting structure which supports the work and tool in a much more rigid manner than was the practice in the past, thereby substantially eliminating any vibration in the parts, and resulting in more accurate work than was heretofore possible.

A further object of the invention is the improved construction of the work and tool supporting means, that is, the bed of the machine tool and the supporting concrete whereby the same cooperate with one another to produce a rigid final assembly.

It is also an object of the present invention to provide an improved fabricated machine tool bed which is extraordinarily rigid in final assembly, yet relatively inexpensive when compared to other types of beds.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

In the drawings:

Figure 1 is a front elevation of a machine tool, such as a grinding machine embodying the improvements of this invention.

Figure 2 is an end elevation of the machine of Figure 1 as seen from the right hand end thereof.

Figure 3 is a sectional view taken substantially on line 3—3 of Figure 1.

Figure 4 is a plan view of the floor or permanent supporting base which supports the machine tool.

Figure 5 is a plan view, similar to Figure 4 but taken through a plane above that of Figure 4 and showing in horizontal cross section the construction of the fabricated bed.

Figure 6 is a fragmentary sectional view taken substantially on line 6—6 of Figure 5.

Figure 7 is a fragmentary longitudinal sectional view through the pit or supporting floor structure as seen, for example, on line 7—7 of Figure 4.

Figure 8 is a transverse sectional view through the fabricated bed and the floor supporting portion as seen from line 8—8 on Figure 5.

Figure 9 is a cross sectional view drawn to an enlarged scale through the structure as would be seen from line 9—9 on Figure 4.

Throughout the several views of the drawings similar reference characters are employed to denote the same or similar parts.

While this invention has application to machine tools generally it is shown in the drawings in connection with a grinding machine, such as the large heavy grinding machine for grinding rolls as used in paper and steel rolling mills. These rolls frequently attain great weight, weighing many tons and must have their operative surface provided with a very fine finish and be held within accurate limits of tolerance. In order to produce the said mill rolls the supporting structure must be very rigid to keep vibrations down to an absolute minimum.

In the past, machine tool beds have generally utilized a relatively deep section of metal, that is, they extended upwardly from the floor to a point substantially waist high thereby in effect disposing the slide ways at the top of a comparatively thin wall. The heavy weight, such as the rolls shown in the drawings and operated upon by these machines, caused considerable deflection in the said beds and due to the substantial pendulum effect of the parts considerable vibration ensued. This, of course, resulted in decidedly inferior work pieces and work which was provided with relatively deep chatters and in some instances, even flats, extending substantially the full length of the roll.

By the present construction the section of the bed so far as height or depth is concerned is very shallow, thereby bringing the guide ways of the bed very close to the surface of the supporting structure, such as the floor or concrete pier upon which it is disposed. By this construction the deflection in the bed is reduced to a minimum and vibration is substantially eliminated since the pendulum effect is reduced to such a small amount as to be substantially negligible. Furthermore, by the present construction use is made of the supporting concrete slab, or the like, to obtain rigidity in the machine because the shallow bed is rigidly connected thereto so as to substantially form a part thereof.

Also, in the past, and particularly with grinding machines of the present invention, a single bed was employed for supporting both the work and the grinding wheel. With this type of construction any deflection or vibration in the bed caused by the work was taken up by the grinding wheel and thereby substantially compounded the irregularities and the like produced in the work. By the construction of the present invention the bed is formed as two independent bed units, one supporting the work and the other the grinding wheel with no physical tie there-between other than the solid concrete slabs disposed therebeneath, thereby preventing any deflection or vibration in one bed or one part of the entire structure interfering with or influencing the operation of the other.

In general, the grinding machine as illustrated in the drawings comprises a forward supporting bed, 15, which will be described in detail later. Mounted on the bed at one end thereof is the headstock 16 with which is associated a driving face plate 17 rotatable through a transmission within the headstock 16 by a prime mover or motor 18 located extraneously of the machine. Projecting from the headstock 16 is a center 19 in opposition to a center 20 carried by the tailstock 21 mounted on the upper surface of the bed 15 for adjustment toward and from the headstock 16. The centers 19 and 20 determine the initial axis of the work or roll 22 and act as terminal abutments therefor.

Supported by the bed 15 between the headstock 16 and tailstock 21 are journal rests 23 and 24 which support the roll 22 by engagement with the journals 25 and 26 thereof.

Behind the forward bed 15 is a second supporting bed 27 supporting a carriage 28 adapted to be traversed longitudinally thereof. The carriage 28 supports a wheel head 29 having rotatably mounted therein a spindle 30. The spindle 30 has secured to its one end a grinding wheel 31 and to its other end a sheave or pulley 32. The sheave or pulley 32 has trained thereabout a flexible transmission 33 which is in turn trained about a sheave or pulley 34 on shaft 35 of prime mover 36. The prime mover 36 is supported by the wheel head and partakes of all movement thereof.

The foregoing general description is similar to constructions heretofore employed except that the forward bed 15 and rear bed 27 were formerly integrally connected instead of being separate and distinct units as described above and illustrated in the drawings. The actual construction of the several units supported by said beds is novel but they form no part of the present application except as later described.

The headstock 16 is shown in cross section in Figure 3 and comprises a substantially oval shaped enveloping member 37 formed of a single piece or sheet of steel. The lower side of the enveloping member 37 is flattened and provided with an opening in which is welded a frame member 38 having an aperture 39 therethrough. Extending transversely of the enveloping member 37 are transverse members 40 and 41. The said transverse members 40 and 41 provide bearings in which is rotatably mounted a jackshaft 42. Also rigidly supported by said members 40 and 41 is a spindle 43 which supports for rotation thereon elements forming a part of the transmission which effects the rotation of the face plate 17 and the work or roll 22 when connected therewith. As a part of the said transmission is the jackshaft, but since this transmission forms no part of the present application it is not further described herein.

The headstock 16 and parts carried thereby are supported by a headstock base indicated generally by the numeral 44 and secured to one end of the forward bed 15. This headstock base 44 comprises a base plate 45 on which is welded bars 46, 47, 48 and 49. These bars form a compartment 50 interiorly thereof which is utilized as a lubricant or oil tank containing the lubricant medium to be supplied to the rotating parts of the transmission of the headstock. In order to return the lubricant to a definite point in the oil tank it has provided therein a drain board comprising a plate 51 having one end welded to the bar 46 and the other end welded to a riser 52 which is of less height than the bar 46, thereby giving an inclination to the plate 51.

Carried by the frame 38 of the headstock 37 is a shelf 53 supporting a pump 54. The pump 54 is driven through the flexible transmission 55 from the jackshaft 42 and is utilized for circulating the lubricant from the tank 50 through the bearings of the transmission elements. For this purpose the pump 54 has extending from one side thereof a suction pipe 56 which has its other end located at or near the low point of the tank 50. From the other side of pump 54 extends a discharge pipe 57 terminating in a lubricant reservoir 58 within the headstock housing. The lubricant within said reservoir 58 is drained therefrom by a plurality of conduits 59 which individually terminate at the different rotatable members of the transmission.

The forward bed 15 is shown in cross section in Figure 8 and comprises channel members 60 and 61 extending the full length of the bed, having the channel portions thereof opposed to one another. Welded to the said members within their channels are respectively angle irons 62 and 63 adapted to strengthen the webbing of said members. The channel members 60 and 61 form the forward side of the said bed, while similar channel members 64 and 65, likewise having their channel portions opposed to one another and having welded within the channels thereof angle irons 66 and 67, form the rear side thereof. Extending substantially the full length of the channels 60 and 61 is a plate 68 having its under side welded to the top flanges of the said channel members. In turn secured to the upper surface of the plate 68 is a bar 69 which forms one of the guides for the tailstock 21 and journal rests 23 and 24. Welded to the lower flanges of the channel members 60 and 61 are a plurality of footing plates 70 which are located at spaced intervals throughout the full length thereof.

The channel members 64 and 65 have welded to their upper flanges a plate 71 which, similar to the plate 68, carries a bar 72 forming the second guide way for the tailstock and journal rests. Also the channel members 64 and 65 have welded to their lower flanges a plurality of footing plates 73 which similar to the footing plates 70 are located at spaced intervals the full length thereof. The footing plates 73 are individually located opposite to the footing plates 70.

From the foregoing it will be noted that the forward side of the bed, including the channel members 60 and 61 and the parts welded thereto, form a substantially tubular frame member extending the full length of the bed. It will likewise be noted that the rear side of the bed is also a substantially tubular member including the channel members 64 and 65 and parts welded thereto.

The top and footing plates of both frame members extend beyond their inner channels 60 and 64 toward one another to provide in effect flanges extending substantially the length of the said frames. Welded to the upper of said flanges is a top or cover upper and lower plate 74 and to the lower flange is welded cross braces 75. Interiorly of the space between the longitudinal frames and upper plate 74 and welded thereto and the cross braces are disposed web braces 76 and angular struts 77 which give rigidity to the bed. From the foregoing it will be noted that the bed in effect has a rectangular boxlike cross section.

The rear or second supporting bed 27 is similar in general construction to the forward bed 15 in that it comprises a forward tubular frame member formed by channels 78 and 79 having welded to their upper flanges plate 80 and their lower flanges spaced footing plates 81 and a rearward tubular frame similarly comprised of channel members 82 and 83, carrying top plate 84 and spaced footing plate 85. The plates 80 and 84 have respectively secured to them bars 86 and 87 which form the guide ways for the carriage 28 and guide said carriage during its traversing movements. The plates 80 and 84 and the footing plates 81 and 85, similar to those of the forward bed 15, overhang the inner edges of the longitudinal frames and have welded thereto cross members 88 and 89, which in turn carry the transverse web plates 90. Additionally, the footing plates 81 and 85 have welded to them the ends of the angular brace members or struts 91.

From the foregoing it will be seen that the rear base is likewise of rectangular boxlike cross section, thereby rigidly supporting the slide 28 during its movements. It will also be noted that in both the forward bed 15 and rearward bed 27 the ways are mounted on channel irons which have their flanges extending toward one another, giving a solid support along the edges of each of the ways.

In machine tools of the character of this application, which are of considerable length, a special support is provided around which is formed a trough which is utilized as the coolant reservoir or supply tank. In the past, this construction has generally taken the form of an island on which the bed was mounted since the supporting structures of past machines were of single integral castings, or a plurality of castings bolted to one another and not separate and distinct units as shown in the present drawings and described above. Furthermore, with past structures and a relatively high bed the center of the work, which reaches as much as five feet or more in diameter, was considerably above the operator, requiring platform structures and the like in front of the bed to enable the operator to properly view the work and control the machine. By the present construction the supporting beds are very low, thereby bringing the work and other parts of the machine near the ground so that the operator may conveniently control same.

As shown in the drawings, the forward bed 15 is mounted on a specially prepared concrete foundation 92 which is very near to floor level, while the rear bed 27 is mounted on a substantial island 93 below floor level. The island 93 is entirely surrounded by a trough which includes longitudinal troughs 94 and 95 and transverse troughs 96 and 97. Located in one or both of the transverse troughs is a pit, such as 98, having its floor considerably below the lowest point of the surrounding trough to which the coolant is drained and from which it is pumped. Since the pumping of the coolant forms no part of the present invention the same is not further shown or described in this application. As seen in Figure 7, the central trough 95 has its floor inclined from the point 99, which is located substantially centrally of its length, to the opposite ends where it drains into the transverse troughs 96 and 97.

In the machine shown in the drawings use is made of a cambering attachment indicated generally in Figure 2 by the numeral 100. This cambering attachment is supported on a base 101 which extends beyond the rear of the bed 27 and for a short distance, as shown in Figure 5, blocks the trough 94. To connect the two ends of this trough and to connect the transverse troughs 96 and 97 with one another the portion supporting the cambering attachment base 101 is provided therethrough with a passage or tunnel 103.

In order to drain any coolant that may find its way in front of the forward bed 15 into the troughs, the supporting foundation 92 thereof is provided beneath the bed 15 with a plurality in inclined gutters 104 inclining from the front of the machine toward the rear. These gutters spill any coolant therein into the longitudinal trough 95 from which it drains to the transverse troughs 96 and 97 and the pit 98.

The forward and rearward beds are individually anchored to their supporting structures and properly levelled at a plurality of points throughout their length. For this purpose, see Figures 4 and 8, the forward bed supporting foundation 92 and the rearward bed island 93 have imbedded therein at a plurality of points along each edge thereof pipes or casings 105. Anchored at the bottom of each of the casings 105, as at 106, is one end of an anchoring bolt 107 which extends upwardly through the said casings above the same. The upper ends of the bolts 107 pass through suitable perforations formed in the footing plates of each of the beds. Between each of said footing plates and the top of the concrete supports is a leveling block indicated generally by the numeral 108, the leveling blocks 108 being utilized for properly leveling the bed at a plurality of points along each edge thereof, whereupon the anchoring bolts 107 are tightened to secure the bed in position.

The leveling blocks 108 are in effect jacks shown in detail in Figure 9. The particular section illustrated in Figure 9 is through the rear bed and the cambering attachment base, wherefore not only the outer leveling block or jack is shown but also the inner one which in reality is located at the rear longitudinal edge of the rear bed where the cambering attachment base extends therebeyond. It is to be understood that normally the jacks at each point are similar to that shown in the right hand end of Figure 9.

Specifically, each jack comprises a base member 109 mounted on the upper surface of the concrete support. The base 109 has an inclined supporting surface 110 on which is mounted a block 111 having an opposed inclined face which lies on the surface 110 of the block 109. The outer end of the block 109 has an upstanding flange 112 in which is formed a vertical slot 113 in which is disposed for rotative and vertical movement a jack screw 114. The jack screw 114 is threaded into a downturned flange or lug 115 of the block 111 and the said lug 115 passes through a longitudinal groove 116 formed in the base 109. The base 109 is further provided with an aperture 117 through which the anchoring bolt 107 passes, while the block 111 has formed therein an elongated aperture 118 through which the bolt 107 likewise passes. The aperture 118 permits the movement of the plug 111 relative to the base 109 while effecting the leveling adjustments of the bed without interference from the bolt 107.

The inner leveling jack shown in Figure 9 is similar to the outer one just described, and comprises a base member 119 integral with the base 109. The base 119 has an inclined face 120 on which is mounted the block 121 movable relative thereto both vertically and horizontally in the same manner as block 111. To effect the movement of the block 121 it has connected therewith a jackscrew 122 extending beneath the cambering attachment base 101 outwardly therebeyond and lies closely adjacent the screw 114.

From the foregoing it will now be seen that there has been provided a machine tool structure particularly adapted to the grinding art in which the massive parts are rigidly supported by fabricated beds which are disassociated from one another, thereby prohibiting any vibration in either bed from effecting the other. By this construction an unusually rigid machine has been provided in which chatter or other irregularities on the work has been reduced to an absolute minimum.

What is claimed is:

1. In a machine tool organization the combination of a pair of beds extending parallel to one another and disposed one behind the other, a member on each of said beds and respectively supporting a tool and work, a support for said beds including a reinforced separate supporting portion for each bed, one of which reinforced supporting portions is in the nature of an island entirely surrounded by a trough, and the other reinforced supporting portion having formed therein inclined gutters for drainage to the trough.

2. In a machine tool organization the combination of a pair of beds extending parallel to one another and disposed one behind the other, a member on each of said beds and respectively supporting a tool and work, a support for said beds including a reinforced separate supporting portion for each bed, one of which reinforced supporting portions is in the nature of an island entirely surrounded by a trough, and the other reinforced supporting portion having formed therein inclined gutters for drainage to the trough, the portion of the trough between the beds supporting portions having its floor inclining in opposite directions to the opposite ends thereof, and a pit located in said ends of the trough.

3. A fabricated bed for machine tools comprising a pair of tubular side members, each composed of channel irons extending the full length of the bed with their channels opposite to one another, guide way bars secured to the upper flanges of opposed channels, and spacing means welded to the opposite sides of said hollow members.

4. A fabricated bed for machine tools comprising a pair of tubular side members, each composed of channel irons extending the full length of the bed with their channels opposite to one another, guide way bars secured to the upper flanges of opposed channels, spacing means welded to the opposite sides of said hollow members, and a plurality of footing plates spacedly secured to the lower flanges of the channel members.

5. A fabricated bed for machine tools comprising a pair of tubular side members, each composed of channel irons extending the full length of the bed with their channels opposite to one another, guide way bars secured to the upper flanges of opposed channels, spacing means welded to the opposite sides of said hollow members, a plurality of footing plates spacedly secured to the lower flanges of the channel members, a support for the bed, and anchoring means projecting from the support and cooperating with the footing plates to secure the bed in position.

6. A fabricated bed for machine tools comprising a pair of tubular side members, each composed of channel irons extending the full length of the bed with their channels opposite to one another, guide way bars secured to the upper flanges of opposed channels, spacing means welded to the opposite sides of said hollow members, a plurality of footing plates spacedly secured to the lower flanges of the channel members, a support for the bed, anchoring means projecting from the support and cooperating with the footing plates to secure the bed in position, and leveling jacks between each footing plate and the support for leveling the bed at a plurality of points.

7. A fabricated bed for machine tools comprising a pair of tubular side members, each composed of channel irons extending the full length of the bed with their channels opposite to one another, guide way bars secured to the upper flanges of opposed channels, spacing means welded to the opposite sides of said hollow members, a plurality of footing plates spacedly secured to the lower flanges of the channel members, a work rotating unit at one end of the bed, and a fabricated base for said work rotating unit welded to the upper flanges of the hollow side channel members at one end thereof.

8. A fabricated bed for machine tools comprising a pair of tubular side members, each composed of channel irons extending the full length of the bed with their channels opposite to one another, guide way bars secured to the upper flanges of opposed channels, spacing means welded to the opposite sides of said hollow members, a plurality of footing plates spacedly secured to the lower flanges of the channel members, a base plate welded to the upper flanges of the longitudinal channel members at one end thereof, a rectangular base welded to the base plate forming a chamber interiorly thereof and constituting a lubricant well, and a work driving headstock mounted on the base.

9. A fabricated bed for machine tools comprising a pair of tubular side members, each composed of channel irons extending the full length of the bed with their channels opposite to one another, guide way bars secured to the upper flanges of opposed channels, spacing means welded to the opposite sides of said hollow members, a plurality of footing plates spacedly secured to the lower flanges of the channel members, a base plate welded to the upper flanges of the longitudinal channel members at one end thereof, a rectangular base welded to the base plate forming a chamber interiorly thereof and constituting a lubricant well, a work driving headstock mounted on the base, said headstock including rotatable members, and means within the headstock for circulating the lubricant in the well.

10. In a machine tool organization of the class described the combination of a pair of supporting beds disposed one behind the other in parallel relationship, a tool support on one of said beds, a work support on the other of said beds, a supporting structure for said beds including a separate reinforced supporting portion for each bed, one of which is an island having a trough extending around four sides thereof and between the said bed supporting portions, the trough between the bed supporting portions inclining from a point substantially midway of its length toward the opposite ends thereof.

11. In a machine tool organization of the class described the combination of a pair of supporting beds disposed one behind the other in parallel relationship, a tool support on one of said beds, a work support on the other of said beds, a supporting structure for said beds including a separate reinforced supporting portion for each bed, one of which is an island having a trough extending around four sides thereof and between the said bed supporting portions, the trough between the bed supporting portions inclining from a point substantially midway of its length toward the opposite ends thereof, the other supporting portion having formed therein a plurality of gutters inclined toward the trough between the bed supports and draining into said trough.

12. In a machine tool organization of the class described the combination of a pair of supporting beds disposed one behind the other in parallel relationship, a tool support on one of said beds, a work support on the other of said beds, a supporting structure for said beds including a separate reinforced supporting portion for each bed, one of which is an island having a trough extending around four sides thereof and between the said bed supporting portions, the trough between the bed supporting portions inclining from a point substantially midway of its length toward the opposite ends thereof, the other supporting portion having formed therein a plurality of gutters inclined toward the trough between the bed supports and draining into said trough, and a plurality of anchoring and leveling means disposed at opposed sides of each bed for leveling said beds at a plurality of points throughout their length and anchoring said beds in adjusted position.

LESTER F. NENNINGER.
WILLETTS PEASLEE.